United States Patent Office 2,925,306
Patented Feb. 16, 1960

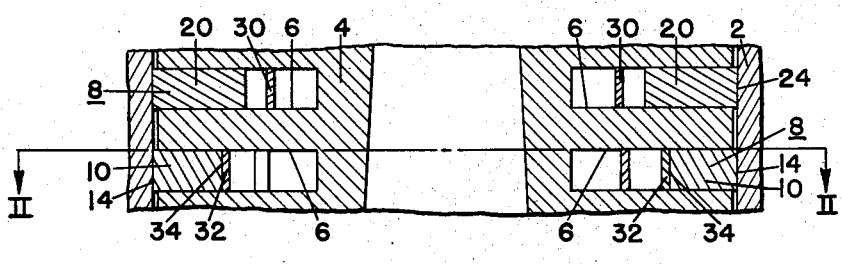
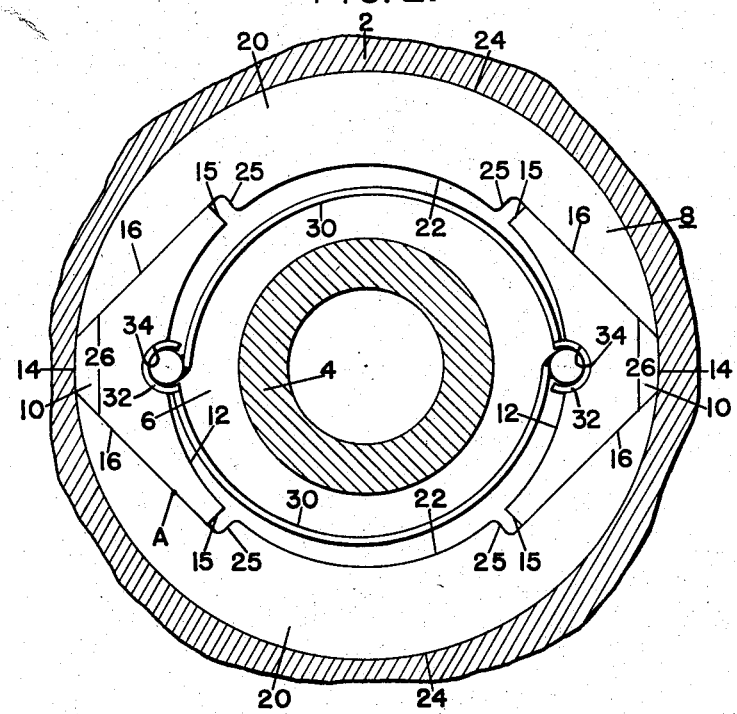
INVENTORS:
ESPER KODRA
EUGENE J. DOPERALSKI

2,925,306

PISTON ASSEMBLY

Esper Kodra and Eugene J. Doperalski, Michigan City, Ind., assignors to Joy Manufacturing Company, Pittsburgh, Pa., a corporation of Pennsylvania Application April 15, 1957, Serial No. 652,727

3 Claims. (Cl. 309—29)

Our invention relates to a packed piston assembly and more particularly to a packed piston ring assembly having the segments thereof of a configuration to obtain uniform outward movement.

At the present time numerous industrial applications require compressed air which is free of hydrocarbons for various well known reasons. In order to meet these requirements it has been common practice to employ a plurality of partially overlapping carbon ring segments which are disposed to form a hollow body extending outwardly around a compressor piston and which engage the sidewall of a compressor cylinder. Such a segmental carbon packing or, as more commonly known, carbon piston ring eliminates the need for lubricating the compressor cylinder. It has also been common practice to provide one or more means spaced inwardly of the cylinder wall and engageable with one or more of the carbon segments to constantly bias each of the carbon segments radially outwardly into engagement with the sides of the compressor cylinder. Due to the configuration of the various carbon segments heretofore employed of which we are aware, uniform radial movement of all segments can not be obtained whereby gaps are formed between some of the segments and the cylinder sidewall. As can be appreciated such gaps are undesirable in compressors as they result in loss of compressor efficiency and cause uneven wear of the segments so that the full life of all segments can not be obtained uniformly.

Accordingly, one object of our invention is to provide a new and improved segmental piston ring assembly of a configuration to obtain uniform radial movement of all segments.

A specific object of our invention is to provide a new and improved segmental piston ring assembly having diametrically spaced wedge segments which have side surfaces slidably engageable with surfaces on other segments and which side surfaces are perpendicular to each other and lie in converging planes.

A more specific object of our invention is to provide a new and improved piston ring assembly having cooperable sliding surfaces which are angularly disposed at an angle of 45° with relation to a cylinder axis.

These and other objects of our invention will become more apparent when taken in conjunction with the following detailed description of a preferred embodiment thereof and the following drawing, in which:

Figure 1 is a longitudinal sectional view of a portion of a piston-type compressor showing the piston, piston ring assembly and the cooperable cylinder side wall;

Figure 2 is a cross sectional view of the piston-type compressor as shown in Figure 1 taken substantially along the lines II—II thereof.

Referring to the drawing it will be noted that a portion of a conventional compressor cylinder 2 is shown in which a cylindrical piston 4 is reciprocably mounted in any suitable manner, not shown. The piston 4 is provided with a plurality of axially spaced circumferential grooves 6 in each of which a segmental packing means is located which is formed from a plurality of carbon block segments. Inasmuch as such piston and cylinder assemblies for such purposes are well known in the art, further illustration and description thereof are not believed to be warranted.

Each of the carbon piston rings comprises a pair of identical diametrically spaced wedge shaped segments 10 which are of a thickness to be closely received between the sides of the groove 6. As shown in Fig. 2, each wedge segment 10 comprises an inner elongated arcuate surface 12 spaced outwardly from the bottom of the groove 6 and a shorter, outer arcuate surface 14 which engages the wall or bore of the cylinder 2. A radially outwardly extending end surface 15 is provided at each end of the inner surface 12 to provide sufficient strength to the ends of the wedge segments 10. The surfaces 15 are connected to the cylinder wall engaging surface 14 by means of elongated side surfaces 16 extending therebetween, the location of which are an important part of our invention.

It will be noted (Fig. 2) that each wedge segment 10 is symmetrically disposed about the horizontal center line of the piston 4, with one of the surfaces 16 extending at an angle of 45° downwardly from the horizontal axis and inwardly of the cylinder 2, and the other of the surfaces 16 extending at an angle of 45° upwardly from the horizontal axis and inwardly of the cylinder 2. Inasmuch as the surfaces 16 of each segment 10 are each located at an angle of 45° to the horizontal axis and on opposite sides thereof, they are perpendicular to each other. It will also be noted that as described the surfaces 16 of a wedge segment 10 lie in planes which are convergent toward the outer side of the piston ring assembly. Further, as the wedge segments 10 are reversely disposed about the vertical center line (Fig. 2) of the piston 4, the surfaces 16 of spaced wedge segments 10 located on the same side of the horizontal axis are also perpendicular to each other. Thus the surfaces 16 of the spaced wedge segments 10, would form the sides of a square, if extended.

Each of the carbon piston rings also comprises a pair of identical diametrically spaced elongated arcuately shaped segments 20 which are of a thickness to be closely received between the sides of the groove 6 and are cooperable with the wedge segments 10 to form a circular hollow body which extends outwardly of the groove 6 into engagement with the wall of the cylinder 2. As shown in Fig. 2, each segment 20 comprises an inner elongated arcuate surface 22 spaced outwardly from the bottom of the groove 6 and an outer elongated arcuate surface 24 which engages the wall or bore of the cylinder 2. The surfaces 22 extend arcuately between the end surfaces 15 located on the same side of the horizontal axis of spaced wedge segments 10, respectively. A radially inwardly extending surface 25 is provided at each end of the surface 22 of each segment 20 to provide a recess in which the outer surfaces 15 of the wedge segment 10 are located. As shown each of the surfaces 25 of a segment 20 are connected to the outer arcuate surface 24 by means of elongated side surfaces 26 which are angularly disposed with relation to the horizontal and vertical axes of the piston 4 in the same manner as the surfaces 16 heretofore described so as to be engageable with the surface 16 similarly disposed.

In order to provide means for biasing the segments 10 and 20 outwardly into engagement with the bore of the cylinder 2 a pair of elongated arcuately shaped spring members 30 are provided adjacent the bottom of each of the grooves 6. As shown, a pair of spring members 30 have arcuate members 32 at the opposite ends thereof, which are pivotally engageable with recesses 34 in the inner surfaces 12 of the wedge segments 10. Such biasing of the segments 10 outwardly causes the segments 20 to also be biased outwardly. For a more complete description and illustration of the structure of the spring members 30 and their coaction with the segments 10 and 20 reference is made herein to the copending application of Eugene J. Doperalski entitled Piston Assembly, Serial No. 652,726, filed April 15, 1957, now Patent No. 2,895,774, patented July 21, 1959, which application has been assigned to the same assignee as this invention. It is also to be realized that although a particular ring biasing means has been shown and described, if desired, any biasing means which is suitable for such purpose may be employed. Further, if desired, a spring bias may be applied to the segments 10 along the horizontal axis of Figure 2, or a spring bias may be applied to the segments 10 and 20 along the horizontal and vertical axis respectively.

As indicated, the purpose of our invention is to retain the sides of the segments 10 and 20 in engagement with each other as the piston 4 reciprocates within the cylinder 2. As the segments 10 and 20 are normally formed from the same material and engage the same cylinder wall their outer surfaces will have the same wear characteristics. The lengths of the outer arcuate surfaces 14 of the wedge segments 10 are, however, considerably shorter than the lengths of the outer arcuate surfaces 24 of the wedge segments 20, so that much smaller areas of the segments 10 will engage the bore of the cylinder 2 than the areas of the segments 20 which engage the bore of the cylinder 2. Accordingly, greater wear will tend to occur on the outer surfaces 14 of the segments 10 so that the segments 10 will tend to move a greater distance radially outward than the segments 20. In view, however, of the engagement of the surfaces 26 with the surfaces 16, the segments 20 will restrain such movement of the segments 10. By employing the wedge segments 10 and 20, as described, the wedge segments 10 and 20 will remain in engagement. Thus assuming a point A which is initially common to each surface 16 and 26 of any one of the engaged surfaces 16 and 26, and which is initially spaced inwardly of the bore of the cylinder 2, as the outer surfaces 14 and 24 of the segments 10 and 20 wear, it is necessary that point A move along the intersection of the surfaces 16 and 26. Due to the identity of the sine and cosine functions of a 45° angle the point A will have equal horizontal and vertical components of movement and accordingly, will remain on the common line defined by the engagement of the surfaces 16 and 26. The illustrative point A may be located at any point on any of the engaged surfaces 16 and 26 and the same described result will occur for a point common to any pair of mating surfaces 16 and 26. Thus, it will be noted that by so locating the engaging surfaces of the carbon ring sections it is possible to retain the segments 10 and 20 in tight engagement with each other. Although one form of a segmental ring has been described it will be obvious that any plurality of segments which provide such pairs of engaging surfaces disposed along perpendicular axes may be employed to accomplish the purposes of our invention.

Having described a preferred embodiment of our invention in accordance with the Patent Statutes, it is to be realized that modifications thereof may be made without departing from the broad spirit of our invention. Accordingly, it is respectfully requested that our invention be interpreted as broadly as possible and as limited only by the prior art.

We claim as our invention:

1. A piston packing comprising, a first and second pair of diametrically spaced sections disposed in engagement with each other to form a hollow body with portions of the circumference thereof being formed by each of said sections, said sections lying in abutting relationship and in the same plane, each of said sections of said first pair of sections having a pair of perpendicularly disposed side surfaces extending convergently outwardly of said body, and each of said sections of said second pair of sections having end surfaces in engagement with one of said side surfaces of each of said first pair of sections, respectively.

2. A piston packing comprising, a first and second pair of diametrically spaced sections disposed in engagement with each other to form a hollow body with portions of the circumference thereof being formed by each of said sections, each of said sections of said first pair of sections having perpendicularly disposed surfaces at the ends thereof extending convergently outwardly of said body, and each of said sections of said second pair of sections located between said first pair of perpendicular surfaces having a pair of perpendicularly disposed side surfaces extending convergently outwardly of said body, in engagement with one of said surfaces of each of said first pair of sections, respectively.

3. A piston assembly comprising, a piston having a circumferential groove therein, a first and second pair of diametrically spaced sections disposed in engagement with each other to form a hollow body with portions of the circumference thereof being formed by each of said sections, said sections lying in abutting relationship in the same plane, said hollow body being located in said groove to extend outwardly therefrom, each of said sections of said first pair of sections having a pair of perpendicularly disposed side surfaces extending convergently outwardly of said body, each of said sections of said second pair of sections having end surfaces in engagement with one of said side surfaces of each of said first pair of sections, respectively, and expanding means located adjacent the bottom of said groove engageable with each of said sections of said first pair to bias all of said sections outwardly of said groove.

References Cited in the file of this patent
UNITED STATES PATENTS

| | | |
|---|---|---|
| 352,166 | Tripp | Nov. 9, 1886 |
| 490,050 | Tripp | Jan. 17, 1893 |
| 840,250 | Pflaum | Jan. 1, 1907 |
| 2,696,414 | Green | Dec. 7, 1954 |
| 2,768,040 | Green | Oct. 23, 1956 |